(United States Patent — Baker — 3,778,029 — Dec. 11, 1973)

[54] BALL VALVE

[75] Inventor: William J. Baker, Orange, Calif.
[73] Assignee: Armco Steel Corporation, Middletown, Ohio
[22] Filed: Nov. 22, 1972
[21] Appl. No.: 308,686

[52] U.S. Cl................... 251/315, 251/172, 251/363
[51] Int. Cl............................................. F16k 5/06
[58] Field of Search..................... 251/315, 316, 317, 251/318, 172, 175, 362, 363

[56] References Cited
UNITED STATES PATENTS

| | | | |
|---|---|---|---|
| 3,288,163 | 11/1966 | Craven | 251/315 X |
| 3,371,907 | 3/1968 | Scaramucci | 251/315 X |
| 3,421,733 | 1/1969 | Stewart, Jr. | 251/172 |
| 3,528,447 | 9/1970 | Kolb | 251/315 X |
| 3,584,641 | 6/1971 | Milleville et al. | 251/315 X |
| 3,590,837 | 7/1971 | Jeanise | 251/363 X |
| 3,667,725 | 6/1972 | Scaramucci | 251/315 |
| 3,667,727 | 6/1972 | Bowden | 251/315 |
| 3,678,956 | 7/1972 | Ebin | 251/315 X |
| 3,698,687 | 10/1972 | Kitamura | 251/315 |
| 3,722,859 | 3/1973 | Murphy et al. | 251/315 |

Primary Examiner—Samuel Scott
Attorney—John W. Melville et al.

[57] ABSTRACT

A ball valve which achieves a bubble-tight low pressure seal by a slight interference fit between the valve seats and the ball. The valve seats are precluded from blowing out when the valve is opening to flow with a high pressure differential thereacross by a relief groove and associated apertures in each of the seat carriers which permit the first flow of fluid to bypass around and behind the upstream seat through the holes in the associated seat carrier.

18 Claims, 10 Drawing Figures

3,778,029

BALL VALVE

BACKGROUND OF THE INVENTION

1. Field of the Invention

The present invention relates to ball valves in which a generally spherical surface of the valve ball engages an annular sealing surface on a valve seat formed of a stiff yet yieldable material.

2. Description of the Prior Art

One of the ultimate goals of the valve manufacturing industry is to produce a valve that provides a fluid-tight closure regardless of whether the valve is being used with high or low pressure fluids. It is desirable that the valve be produced at a reasonable cost so that it is competative with presently manufactured valves.

Unfortunately, the design and construction of a valve that provides a fluid-tight closure at both high and low pressures and that can be economically produced has presented various problems that have not been, heretofore, satisfactorily solved.

Usually the seats in these ball valves are resilient rubber-like material or Teflon for low pressure, and nylon or similar rigid plastic for high pressure. However, one of the common problems is that the upstream seats have a tendency to extrude the seals from the valves, or to blow out of their cavity, when the valve is opened at high upstream pressure and low downstream pressure. In order to alleviate this problem, the prior art has suggested a means for pressure equalizing around the outside diameter of the upstream seat. This may take the form of slots in the seat to provide a fluid passage for pressure equalization. For example, when the pressure causes the upstream seat to move against the ball and the ball moves downstream, the pressure simply leaks into the ball port through the relief slots. The upstream seat is then allowed to return to its original position and the downstream seat provides the leak-proof seal. Although this procedure reduces the chance for blow-out of the upstream seat at high pressure differential, it permits the valve to seal only on the downstream seat.

SUMMARY OF THE INVENTION

The present invention provides an improvement in a ball valve having a valve body provided with an inlet and an outlet flow passages and a valve chamber communicating with the inlet and outlet flow passages. A centrally bored flow control ball is rotatably disposed within the chamber and is movable under the force of fluid pressure thereon. The ball is provided with a generally spherical external surface. Means are provided for rotating the ball between the valve open and closed positions. Two annular valve seats formed of yieldable polymeric material are disposed in encircling relation to the inner ends of the respective flow passages, and two annular seat carriers are disposed in encircling relation around the respective valve seats, the seat carriers being contiguous with the walls of the valve chamber and encircling the inner ends of the respective flow passages.

There are three facets to the present invention. First is the manner in which the present invention achieves the bubble-tight low pressure seal using the slight interference fit between the plastic sealing material and the ball. Each valve seat is provided with an annular sealing surface having in radial section a concave curvature and confronting the ball to seal thereagainst. The curvature of the valve seat is smaller than the radius of the curvature of the ball such that interference loading of the seat is accomplished on assembly. The seat surface, which closely approximates a spiral, generally comprises a compound curve made up of a 45° plane on one end and a radius of curvature at the other end which varies from 40 percent to 70 percent of the radius of the ball.

A second and very significant improvement in the ball valve of the present invention is the manner in which the valve seats are precluded from blowing out when the ball valve is opening to flow with a high pressure differential thereacross. This is accomplished by providing apertures in the seat carriers to prevent distortion of the upstream valve seat when the valve is opened, with both the upstream and downstream valve seats being energized in the closed position. The relief holes in the seat carriers act to vent pressure from the upstream flow passage to the valve chamber only for an instant during rotation of the flow control ball, and the timing of this vent action is always prior to the downstream valve seat's commencing its opening, because the upstream valve seat attempts to blow-out or distort first and in so doing, it uncovers the vent apertures in its respective seat carrier to equalize pressure on both sides of the upstream valve seat.

The third feature of the ball valve of the present invention is an optional pressure equalizing seal necessitated because the vent apertures in the seat carriers do not allow pressure equalization when the flow ball is fully closed, or opened. According to the present invention this problem is circumvented by a pressure equalizing seal which insures that only the downstream valve seat will be active. The equalizing seal comprises an annular U-shaped seal between the seat carriers and the wall of the valve chamber. More particularly, the seal includes a U-shaped Teflon jacket surrounding a U-shaped spring, with the bases of the jacket and the spring being separated by an antiexpansion band.

DESCRIPTION OF THE PREFERRED EMBODIMENTS

The ball valve 10 of the present invention is particularly suited to oil field purposes, such as, for example, use in well test manifolds where periodic testing or diverting of a particular fluid stream from the normal production flow to a separate vessel is desired. However, it will be understood that while the ball valve 10 of the present invention is especially suited to oil field purposes, it also lends itself to systems in other industries.

Figure 1:
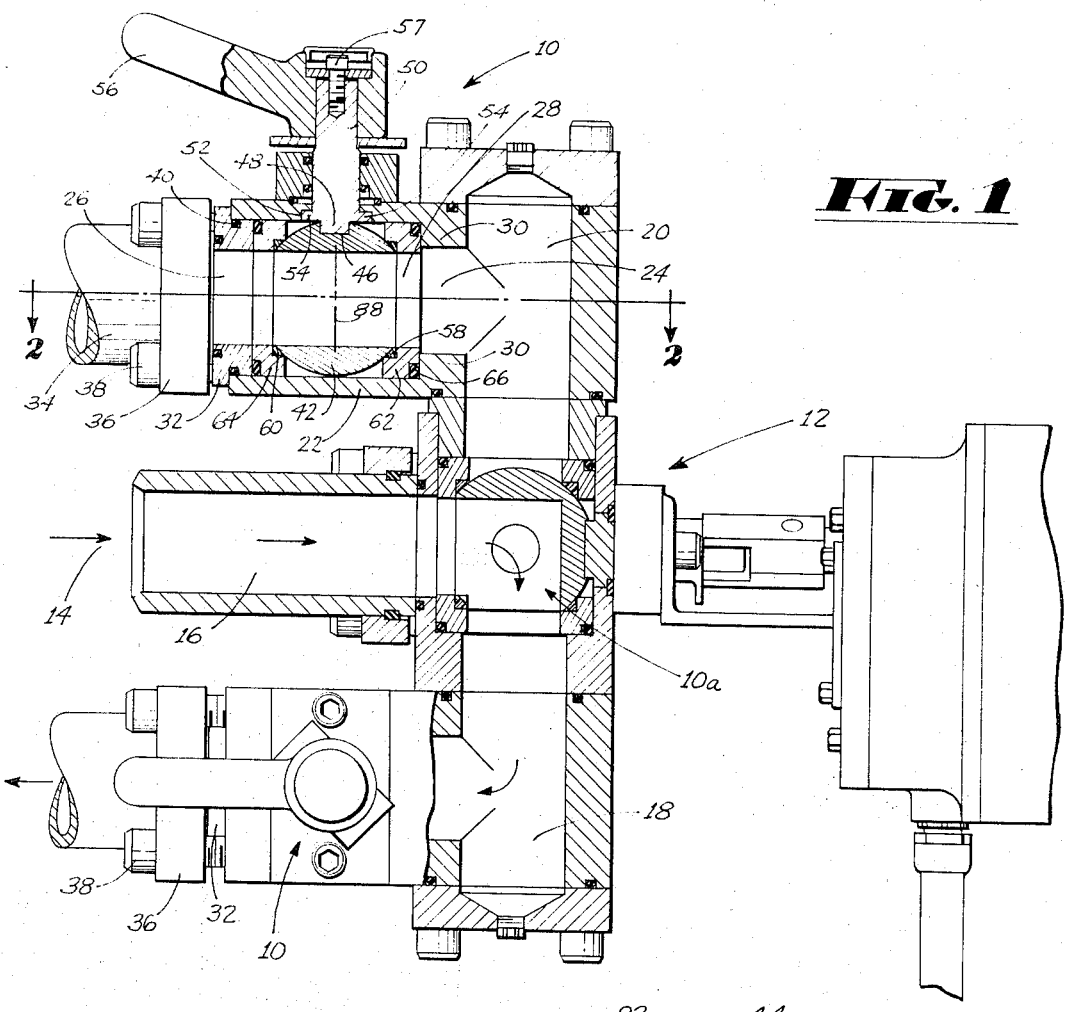
FIG. 1 is a vertical cross-section of a typical well manifold which incorporates therein the improved ball valves of the present invention.
Figure 4:
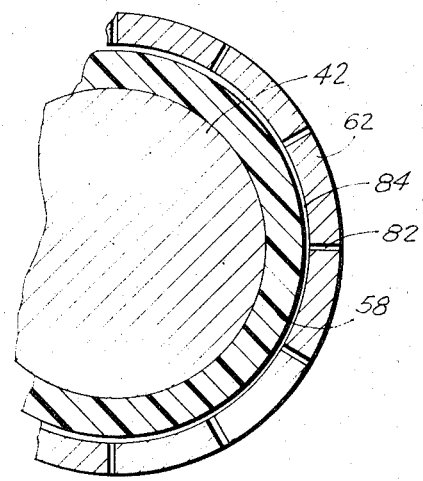
FIG. 4 is a partial cross-sectional view taken along the line 4—4 of FIG. 2 showing the seat carrier, valve seat and flow control valve.

Referring to the drawings and to FIG. 1 in particular, the ball valve 10 of the present invention is shown in a typical well test manifold arrangement 12. As is well known, normally in oil field production, oil streams will be going into the common production line except for a particular well being tested which will have its flow diverted into a smaller test chamber and then to a test vessel. As can be seen from the test manifold arrangement 12 of FIG. 1, the flow stream 14 enters the manifold into an inlet chamber 16. From the inlet chamber 16, it is diverted downward into the high volume production chamber 18 or upwards into the alternative production chamber 20. This is accomplished by any suitable valve or by raising or lowering a plug inside the inlet chamber 16. However, for purposes of this disclosure, it will be seen that a 3-way ball valve 10a of the present invention is utilized for this purpose.

Typical so-called standard 2-way ball valves 10 of the present invention are shown in the test manifold arrangement 12 of FIG. 1 positioned in the production chambers 18 and 20.

The ball valve 10 of the present invention includes a valve body 22 having an inlet flow passage 24 and an outlet flow passage 26 and a valve chamber 28 communicating with the inlet and outlet flow passages 24 and 26, respectively.

The inlet and outlet flow passages 24 and 26, respectively, may be adapted as desired to accommodate the various arrangements to which the valve 10 of the present invention will be adapted. For example, the inlet flow passage 24 may include a shoulder portion 30 integral with the valve body 22. In like manner, the inlet flow passage may have a partially threaded inlet having an enlarged bore forming a shoulder therein. The outlet portion or flow passage 26 may include a retainer 32 which sealing abuts the pipe 34. The retainer 32 is maintained abutting the pipe 34 and secured to the valve body 22 by suitable means, such as by the flange 36 which is securely held against the retainer 32 by the bolts 38 which are threadedly received by the valve body 22.

Suitable O-rings 40 seal the flange 32 against the valve body 22 and the flange 36.

As can be seen, the valve chamber 28 is provided with a generally cylindrical outer wall meeting an annular end wall around the inlet and outlet flow passages 24 and 26, respectively. A flow control ball 42 is rotatably disposed or movably positioned in the valve chamber 28. The flow control ball 42 has a centrally bored flow passageway 44 extending therethrough providing for fluid flow from the inlet flow passage 24 to the outlet flow passage 26 when the flow passage 44 is aligned therewith. The valve ball 42 is generally provided with a spherical external surface having a rectangular slot 46 in the upper side thereof. The slot 46 is sized to receive a lower rectangular end 48 of a valve operating member 50. The rectangular slot 46 is generally longer than the rectangular end 48 of the operating member 50 so that the valve ball 42 can shift relative to the operating member 50 when the valve 10 is in a closed position. Thus, the valve ball 42 is what is commonly known as a floating ball.

The operating member 50 extends upwardly through a radial bore 52 extending outwardly from the valve chamber 28. The operating member 50 has a peripheral flange 54 located near the lower end thereof in engagement with the valve body 22 to limit the upper movement of the operating member 50 in the bore 52. The upper end of the operating member 50 is connected to an operating handle 56 by a suitable pin or cap screw 57.

Figure 2:
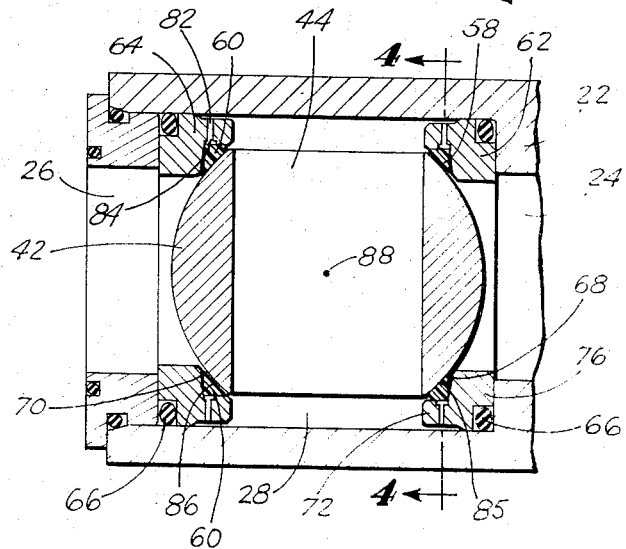
FIG. 2 is a partial cross-sectional view taken along the line 2—2 of FIG. 1 when the ball valve is in the closed position.
Figure 3:
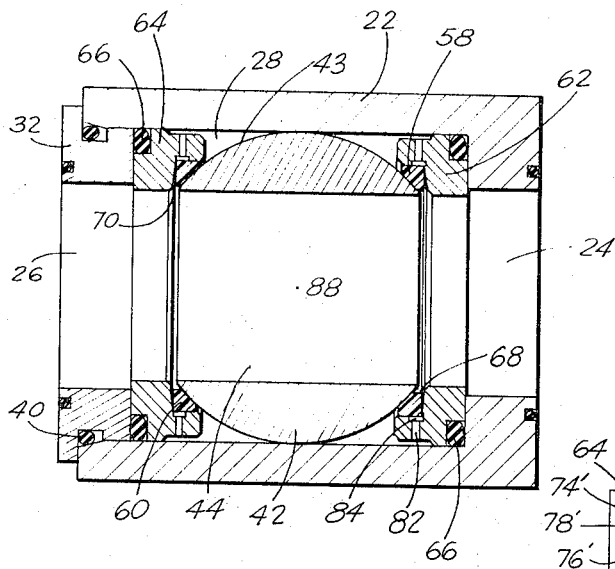
FIG. 3 is a partial cross-sectional view similar to that shown in FIG. 2 wherein the ball valve is in the opened position.

The arrangement of the ball 42, operating member 50, and operating handle 56 is such that rotation of the handle 56 results in a corresponding rotation of the valve ball 42 from an open position as shown in FIGS. 1 and 3, to a fully closed position as shown in FIG. 2. If desired, the operating handle 56 may be provided with a suitable stop portion arranged to engage spaced stop means on the valve body 22 to limit the rotation of the valve ball 42 to an angle of 90° that is, from the fully open position to the fully closed position.

As best seen in FIGS. 2 and 3, the spherically curved external surface 43 of the flow control ball 42 slidably engages two annular valve seats 58, 60 disposed in encircling relation to the inner ends of the respective flow passages 24, 26 opening into the valve chamber 28. The valve seats 58, 60, in the preferred form of the invention, are constructed from a relatively hard and resilient synthetic resin, such as nylon, Teflon, or Delrin. However, other elastomers, such as natural or synthetic rubber, may also be used satisfactorily. The specific composition, hardness and resiliency of the material used to construct the seats 58, 60 depends upon the intended service in which the valve 10 is to be utilized. Accordingly, it is contemplated that the designer will select for use in constructing the valve seats 58, 60 a yieldable material of suitable physical qualities, the designer taking into account in the selection of a particular seat material the chemical characteristics of a fluid to which the valve will be exposed, temperature and pressure conditions under which the valve will operate in service and other pertinent considerations routinely considered by valve designers in the selection of particular structural materials for particular valves.

In the valve 10 of the present invention the valve seats 58, 60 are seated in the valve seat carriers 62 and 64, respectively, which are disposed in encircling relation around the respective valve seats and are contiguous with the wall of the valve chamber 28 and in sealable engagement therewith by means of suitable O-rings 66. The seat carriers 62, 64 are provided with annular recesses 68, 70, respectively. As seated in the annular recess 68 of the seat carrier 62, the valve seat 58 is encircled by first annular support means 72 which contains the valve seat 58 against radial expansion and is confronted along its radial side 74 opposite from the ball 42 by second annular support means 76 extending radially inward along the adjacent valve seat side 74 to support the valve seat 58 against axial force supplied by the ball 42 in service.

Figure 8:
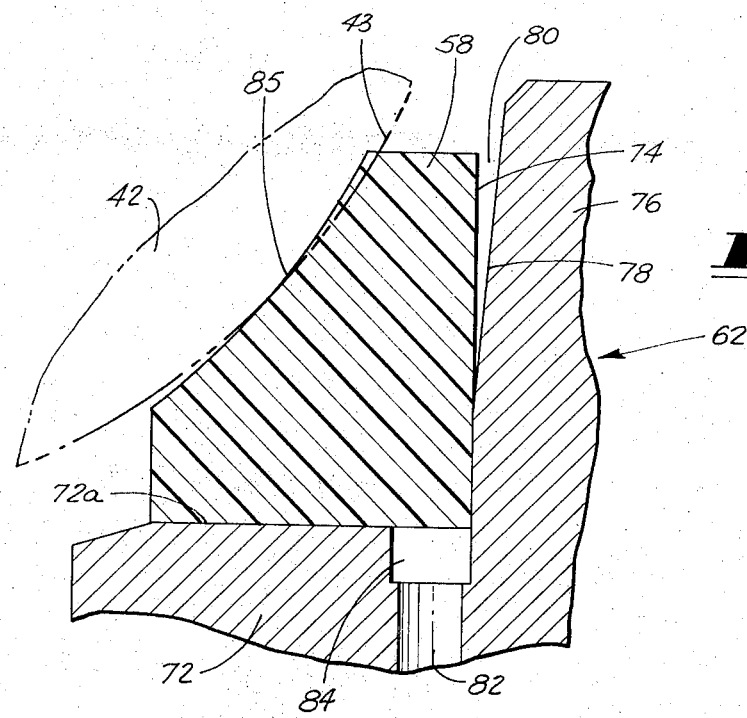
FIG. 8 is a fragmentary radial and longitudinal sectional view on an enlarged scale illustrating the positional relationship of one of the two valve seats and its respective valve seat carrier to adjacent portions of the flow control ball before the ball is displaced by the force of fluid pressure on the ball.
Figure 9:
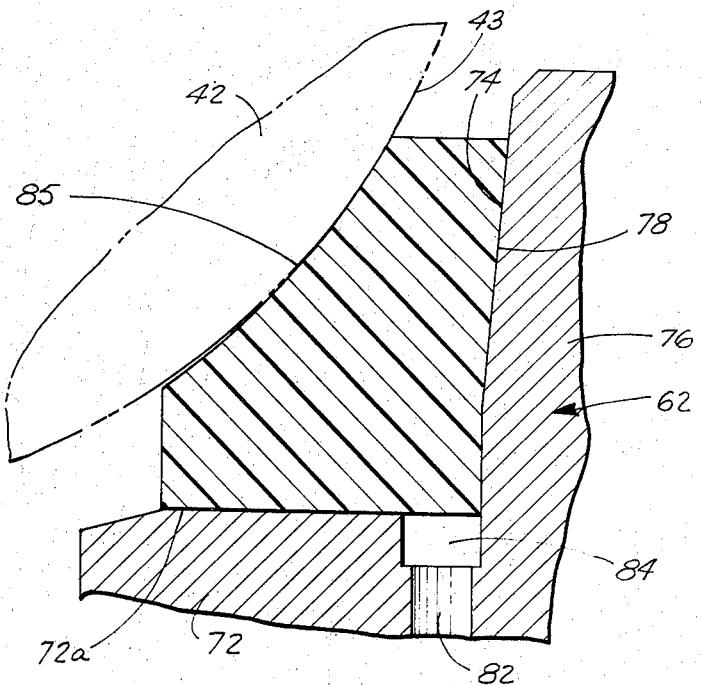
FIG. 9 is a fragmentary sectional view similar to FIG. 8 but illustrating the positional relationship of one of the valve seats and its respective seat carrier to adjacent portions of the flow control ball after the ball has been shifted somewhat in position by the force of fluid pressure on the ball.

As illustrated best in FIGS. 2, 3, 8 and 9, the radially outward portion 78 of the second annular support means 76 has flat surface engagement with the adjacent radially outward portion 74 of the valve seat 58 to sustain the outward portion 74 of the valve seat 58 against axially outward displacement. The radially inward portion 74 of the valve seat 58 and the confronting radially inward portion of the second support means 76 are shaped in relation to each other to diverge progressively away from each other in a radially inward direction to provide, when the parts of the valve 10 are assembled together, as illustrated in FIG. 8, a clearance space 80 between the radially inward portion of the radially outward side 74 of the valve seat 58 and the second support means 76 which allows clearance for limited dynamic displacement or working of the valve seat 58 when the valve 10 is in operation.

In the preferred construction illustrated, the clearance space 80 is provided by tapering the radially inward portion 78 of the second support means 76 so as to diverge inwardly away from the adjacent seat surface 74 as illustrated.

A plurality of spaced radial apertures 82, joined together by an annular relief groove 84 on the axially inward surface 72a of the first support means 72 of the seat carrier 62, extend through the first supporting means 72 of the seat carrier 62. The underside 72b of the first support means 72 is provided with an annular recess 72c which allows the radial apertures 82 access to the valve chamber 28 of the valve body 22 when the seat carrier 62 is contiguous with the wall of the valve chamber 28.

The valve seat 60 and its respective seat carrier 64, with the adjacent side of the ball 42, constitute a mirror image of the valve seat 58 and the seat carrier 62 in the valve 10 illustrated and are shaped and supported in the same manner as the valve seat 58 and the seat carrier 62. To avoid unnecessary duplication of the descripton previously recited in relation to the seat 58, the seat carrier 62 and structural features, the valve seat 60 and the seat carrier 64 corresponding to counterparts previously described in relation to the valve seat 58 and the seat carrier 62 are denoted with the same reference numerals with the addition of the notation " ' ."

In the valve 10 illustrated, the two yieldable valve seats 58, 60 are provided to effect sealing of the valve 10, when closed, on both the upstream and downstream sides of the ball 42 and to make the valve 10 equally useful for blocking differential fluid pressure across the valve in either direction.

Figure 5:
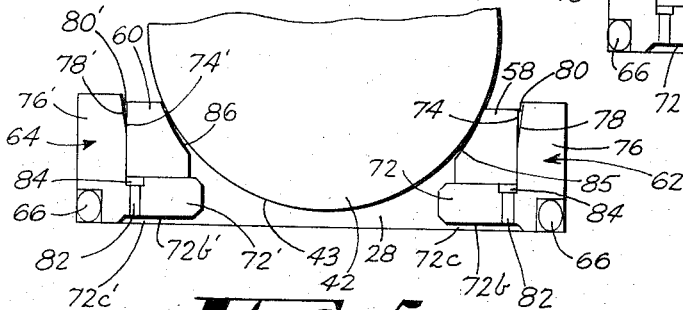
FIG. 5 is a fragmentary radial and longitudinal schematic view illustrating the initial contact on assembly of the flow control valve and the valve seats.
Figure 6:
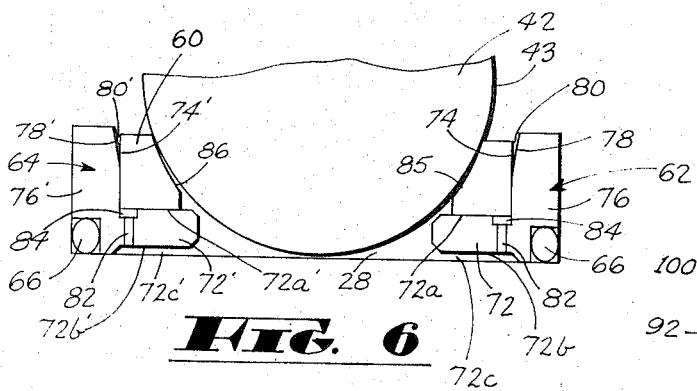
FIG. 6 is a fragmentary radial and longitudinal schematic view similar to FIG. 5 illustrating the positional relationship between the flow control valve and the valve seats and their respective valve seat carriers following final assembly of the ball valve according to the present invention.

The two valve seats 58, 60 define two annular sealing surfaces 85, 86, respectively, confronting the spherically curved surface 43 of the flow control ball 42 and being formed individually as surfaces of revolution about the valve seat axis 88, which is common in both valve seats 58, 60. As viewed in radial section (for example, FIGS. 8 and 9 for the sealing surface 85 of the valve seat 58), the sealing surfaces 85, 86, each have a concave curvature generally approximating the spherical curvature of the adjacent external ball surface 43. The curvature of each valve seat 58, 60 is smaller than the radius of the curvature of the ball 42 such that interference loading of the valve seats 58, 60 is accomplished on assembly (see for example, FIGS. 5 and 6). The seat surface 85, 86 of each valve seat 58, 60 closely approximates a spiral. However, since a machineable spiral is difficult to construct, it has been found that a close approximation thereof is achieved by a compound curve made up of a 45° plane on one end and a radius of curvature at the other end which varies from 40 to 70 percent of the radius of the ball 42.

In some instances pressure equalization of the upstream valve seat is desirable in order to reduce the turning torque of the valve. Since torque is a function of frictional drag on the valve seats, it follows that if only the downstream seat is energized the friction will be less than when both seats are energized. The torque increases because of the magnitude of the compressive seating load.

Figure 10:
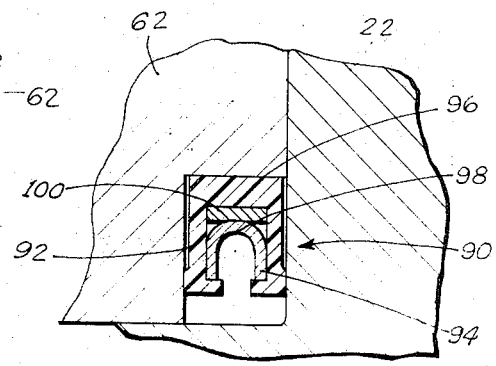
FIG. 10 is a fragmentary sectional view showing the pressure equalizing seal of the present invention.

In the event it is desirable to provide pressure equalization of the upstream seat, this may be readily accomplished by exchanging the 0-rings 66 between the seat carriers 62 and 64 and the wall of the valve chamber 28, with an annular U-shaped seal 90. As best seen in FIG. 10, the annular U-shaped seal 90 comprises a U-shaped jacket 92, preferably of Teflon, surrounding a U-shaped spring 94, with the bases 96 and 98 of the jacket 92 and spring 94, respectively, being separated by an antiexpansion band 100. As can be seen, the antiexpansion band 100 strengthens the seal 90 in a radial direction from sudden surge pressures, precluding inadvertent sealing of the outside diameter of the upstream seat carrier.

Figure 7:
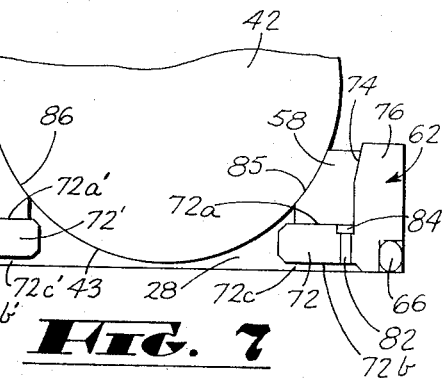
FIG. 7 is a fragmentary radial and longitudinal schematic view similar to FIGS. 5 and 6 when the ball valve is under high pressure loading.

In operation, and specifically referring to FIGS. 2, 3, 7, 8 and 9, imagine a high differential pressure while the valve is in the closed position shown in FIGS. 2 and 7. Both upstream and downstream valve seats 58 and 60 are effecting a seal against the surface 43 of the flow control ball 42 by the floating seat carriers 62 and 64. This is shown schematically in FIG. 7. The 0-ring 66 on the upstream seat carrier 62 is sealing around the outside diameter of the seat carrier 62 providing a seal area larger than the seat area. Accordingly, the upstream seat carrier 62 is driven tightly against the upstream valve seat 58 and in turn the surface 43 of the ball 42. The ball 42 in turn is driven into a firm seating position against the downstream valve seat 60 and seat carrier 64. When the ball 42 is rotated via the operating member 50 and associated operating handle 56 to introduce momentary throttling at high differential, there is created a tendency for the upstream valve seat 58 to blow-out when the bore 44 of the ball 42 leaves the valve seat 58 unsupported. As the valve seat 58 deflects minutely (only a few thousandths of an inch), it opens the pressure relief groove 84 connected with the apertures 82 in the first support means 72 of the seat carrier 62 to the valve chamber 28 of the valve body 22, so as to vent the pressure differential without causing blow-out of the valve seat 58 from the seat carrier 62.

The relief groove 84 and apertures 82 in the seat carrier 62 of the valve 10 of the present invention prevent distortion of the upstream valve seat 58 when the valve 10 is opened at high differential pressure, but both upstream and downstream valve seats 58 and 60 are energized in the closed position. The relief grooves 84 and apertures 82 act to vent pressure from the upstream passage to the valve chamber 28 only for an instant during rotation of the valve, and the timing of this vent action is always prior to the downstream valve seat 60 commencing its opening because the upstream valve seat 58 attempts to blow-out or distort first and in so doing, it uncovers the relief groove 84 and apertures 82 in the seat carrier 62 to equalize pressure on both sides of the upstream valve seat 58. Accordingly, it will be seen that the relief groove 84 and apertures 82 in the upstream seat carrier 62 are active only for an instant during rotation, and when the valve 10 is fully closed, or fully open, they are shut-off due to the seat carrier 62 being seated around the full 360° circumference.

The foregoing described method of venting pressure to avoid upstream valve seat blow-out is far superior to prior art methods of grooving the valve seat, because the independent seat carriers act to float with the pressure and effect upstream seat sealing, as well as assisting in the retention of the valve seats to the seat carriers. This feature also provides superior shut-off capability because either one of the two valve seats can be partially or completely ineffective due to cutting from foreign matter, etc., and yet the valve 10 of the present invention will provide complete and positive shut-off.

It should also be noted that one of the features which some prior art valves offer is the "Double Block and Bleed" feature. Briefly, this is the ability to seal on both valve seats of a valve so that an atmospheric bleed of the pressure trapped in the valve chamber will determine if either or both seats are leaking. If the bleed port does not continue to leak pressure, then both valve seats are holding pressure. The valve 10 of the present invention provides "Double Block and Bleed" with only the additional requirement of a bleeder valve on the valve body 22.

In view of the fact that the relief groove 84 and apertures 82 in the seat carriers 62, 64 do not allow pressure equalization when the valve 10 is fully closed, or open, the turning torque is higher when the valve chamber pressure is zero before the valve 10 is opened, then when the valve chamber pressure is equal, or nearly equal, to the upstream pressure, as caused by normal trapping of the pressure during the previous closing action. In order to circumvent this somewhat unpredictable valve chamber pressure and thus an unpredictable torque, the pressure equalizing seal 90 will insure that only the downstream valve seat will be active. The pressure equalizing seal 90 reduces the valve 10 to the same functional seating arrangements as taught by the prior art, and therefore cancels the features of double sealing for severe service in erosive conditions, and the aforementioned "Double Block and Bleed" which may be utilized as desired.

It should again be noted that the ball sealing of the valve 10 of the present invention is accomplished by valve seats which utilize hard plastic in a manner that creates a spring action for interference loading to the ball 42 during the assembly. The relatively high load created on the interference area of the valve seats permits bubble-tight sealing at low pressure even though the plastic valve seats 58, 60 are harder than most seats commonly used for low pressure applications. Thus the hard plastic valve seats 58, 60 of the present invention achieve good low and high pressure sealing. Due to the fact that the curvature of the valve seats 58, 60 is smaller than the radius of curvature of the ball 42, interference loading of the seat is accomplished on assembly. The seating face in the metal seat carriers 62, 64 is tapered slightly to allow space for the plastic valve seats 58, 60 to deflect during assembly. After assembly the curvature of the valve seats 58, 60 closely approximates the ball radius, and provides a relatively large bearing area for the ball to seat upon for high pressure application. Thus the interference loading provides a good low pressure seal, and the firm plastic of the valve seats 58, 60 supporting the ball 42 over a large bearing area allows the valve 10 to be used in high pressure applications.

It should also be noted that while the metal seat carriers 62, 64 of the valve 10 of the present invention perform the important functional requirement of preventing the plastic valve seats 58, 60 from blowing out when the valve 10 is opened at high pressure differential, they also provide a convenient means for assemblying or servicing valve 10 requiring the replacement of valve seats 58, 60.

The ball valve 10 of the present invention has been subjected to numerous ball valve tests with excellent results. Such tests clearly establish that the seat carriers 62, 64 and the valve seats 58, 60 of the ball valve 10 of the present invention allows block and bleed service to full pressure rotating of the valve. This accomplishment is one that no other floating ball valve design has been able to achieve.

While certain preferred embodiments of the invention have been specifically illustrated and described, it is understood that the invention is not limited thereto, as many variations will be apparent to those skilled in the art, and the invention is to be fiven its broadest interpretation in the terms of the following claims.

The embodiments of the invention in which an exclusive property or privilege is claimed are defined as follows:

1. A valve comprising a valve body having an inlet and outlet flow passages and a valve chamber communicating with the inlet and outlet flow passages, said valve chamber having a generally cylindrical outer wall meeting an annular end wall around said inlet and outlet flow passages, a centrally bored flow control ball rotatably disposed within said chamber and being movable under the force of fluid pressure thereon, said ball having thereon a generally spherical external surface, said valve body defining a radial bore extending outwardly from said central bore in alignment with said ball, means for rotating said ball between said valve open and valve closed positions thereof including an operating member operatively connected to said ball and extending outwardly from said valve chamber, two annular valve seats formed of yieldable polymeric material and disposed in encircling relation to the inner ends of said respective flow passages, and two annular seat carriers disposed in encircling relation around said respective valve seats, said carriers being contiguous with the wall of said valve chamber and encircling the inner ends of said respective flow passages; characterized 1. by each said valve seat having an annular sealing surface having in radial section a concave curvature and confronting said ball to seal thereagainst, the curvature of each said valve seat being smaller than the radius of the curvature of said ball such that interference loading of each said valve seat is accomplished on assembly, each said seat surface closely approximating a spiral;

2. by each of said seat carriers comprising a first annular support member engaging its respective valve seat and containing said valve seat against radial expansion, and a second annular support member extending radially inward along the radial side of its respective valve seat opposite from said ball to sustain the outward portion of said valve seat against the axial force of said ball, the radially inward portion of said valve seat and the adjacent portion of said second annular support member normally being spaced somewhat from each other when said valve seat is in an unstressed condition to provide a clearance space between the radially inward portion of the radially outward side of said valve seat and said second member which allows clearance for dynamic displacement of said valve seat when said valve is in operation; and, 3. by a plurality of spaced radial apertures through said first annular support member of said seat carriers; whereby when said ball is rotated from said valve closed position to said valve opened position, introducing momentary throttling at high differential, said upstream valve seat deflects minutely against said second member of its respective seat carrier, opening said apertures in said first member of its respective seat carrier to said valve chamber so as to vent the pressure differential without causing a blow-out of said upstream valve seat from said seat carrier.

2. The valve according to claim 1, wherein a relief groove is provided on the radially inward surface of said first member of each of said seat carriers connecting said apertures.

3. The valve according to claim 1, wherein the radially inward portion of said valve seat and the confronting radially inward portion of said second member of said seat carrier are shaped in relation to each other to diverge progressively away from each other in a radially inward direction to provide, when the parts of said valve are assembled, said clearance space between the radially inward portion of the radially outward side of said valve seat and said second member.

4. The valve according to claim 1, wherein said clearance space is provided by the confronting radially inward portion of said second member which is tapered so as to diverge inwardly away from the radially inward portion of said valve seat.

5. The valve according to claim 1, wherein each said valve seat surface comprises a compound curve made up of a 45° plane on one end and a radius of curvature at the other end which varies from 40 to 70 percent of the radius of said ball.

6. The valve according to claim 1, wherein pressure equalization of the upstream valve seat is provided by an annular U-shaped seal between at least one of said seat carriers and the wall of said valve chamber that can be energized in one direction only, said seal comprising a U-shaped jacket surrounding a U-shaped spring, the bases of said jacket and spring being separated by an anti-expansion band.

7. A valve comprising a valve body having an inlet and outlet openings and the valve chamber thereof communicating with said openings, said valve chamber having a generally cylindrical outer wall meeting an annular end wall around the inlet and outlet openings, a valve ball supported in said valve chamber for movement between open and closed valve positions thereof, two annular valve seats formed of yieldable polymeric material and disposed in encircling relation to the inner ends of the respective flow passages, and two annular seat carriers disposed in encircling relation around the respective valve seats, said carriers being contiguous with the walls of said valve chamber and encircling the inner ends of said respective flow passages; characterized 1. by each valve seat having an annular sealing surface having in radial section a concave curvature and confronting said ball to seal thereagainst, the curvature of each said valve seat being smaller than the radius of curvature of said ball such that interference loading of said seat is accomplished on assembly, each said seat surface closely approximating a spiral;

2. by each of said seat carriers comprising a first annular support member engaging its respective valve seat and containing said valve seat against radial expansion, and a second annular support member extending radially inward along the radial side of its respective valve seat opposite from said ball to sustain the outward portion of said valve seat against the axial force of said ball, the radially inward portion of said valve seat and the adjacent portion of said second annular support member normally being spaced somewhat from each other when said valve seat is in an unstressed condition to provide a clearance space between the radially inward portion of the radially outward side of said valve seat and said second member which allows clearance for dynamic displacement of said valve seat when said valve is in operation; and, 3. by a plurality of spaced radial apertures through said first annular support member of said seat carriers;

whereby when said ball is rotated from said valve closed position to said valve opened position, introducing momentary throttling at high differential, said upstream valve seat deflects minutely against said second member of its respective seat carrier, opening said apertures in said first member of said seat carrier to said valve chamber so as to vent the pressure differential without causing a blow-out of said upstream valve seat from said seat carrier.

8. The valve according to claim 7, wherein a relief groove is provided on the radially inward surface of said first member of each of said carriers connecting said apertures.

9. The valve according to claim 7, wherein the radially inward portion of said valve seat and the confronting radially inward portion of said second member of said seat carrier are shaped in relation to each other to diverge progressively away from each other in a radially inward direction to provide, when the parts of said valve are assembled, said clearance space between the radially inward portion of the radially outward side of said valve seat and said second member.

10. The valve according to claim 7, wherein said clearance space is provided by the confronting radially inward portion of said second member which is tapered so as to diverge inwardly away from the radially inward portion of said valve seat.

11. The valve according to claim 7, wherein each said valve seat surface comprises a compound curve made up of a 45° plane on one end and a radius of curvature at the other end which varies from 40 to 70 percent of the radius of said ball.

12. The valve according to claim 7, wherein pressure equalization of the upstream valve seat is provided by an annular U-shaped seal between at least one of said seat carriers and the wall of said valve chamber that can be energized in one direction only, said seal comprising a U-shaped jacket surrounding a U-shaped spring, the bases of said jacket and spring being separated by an anti-expansion band.

13. A valve seat and an associated seat carrier for use between the ball and the flow passage of a ball valve having a floating ball in a valve chamber partially defined by a cylindrical outer wall and an annular end wall encircling the flow passage, comprising a valve seat formed of yieldable polymeric material and disposed in encircling relation to the inner end of said flow passage, and an annular seat carrier disposed in encircling relation around said valve seat, said seat carrier being contiguous with the wall of said valve chamber and encircling the inner end of said flow passage, said valve seat having an annular sealing surface having in radial section a concave curvature and confronting said ball to seal thereagainst, the curvature of said valve seat being smaller than the radius of the curvature of said ball such that interference loading of said seat is accomplished on assembly, said seat surface closely approximating a spiral, said seat carrier comprising a first annular support member engaging said valve seat and containing said valve seat against radial expansion, and a second annular support member extending radially inward around the radial side of the valve seat opposite from said ball to sustain the outward portion of said valve seat against the axial force of said ball, the radially inward portion of said valve seat and the adjacent portion of said second member normally being spaced from each other when the valve seat is in an unstressed condition to provide a clearance space between the radially inward portion of the radially outward side of said valve seat and the second member which allows clearance for dynamic displacement of the valve seat when said valve is in operation, said first annular support member of said seat carrier being provided with a plurality of spaced radial apertures therethrough, whereby when said ball is rotated from said valve closed position to said valve open position, introducing momentary throttling at high differential, said valve seat deflects minutely against said second annular support member of said seat carrier, opening said apertures in said first annular support member of said seat carrier to said valve chamber so as to vent the pressure differential without causing a blow-out of said valve seat from said seat carrier.

14. The valve seat and associated seat carrier according to claim 13, wherein a relief groove is provided on the radially inward surface of said first member connecting said apertures.

15. The valve seat and associated seat carrier according to claim 13, wherein the radially inward portion of said valve seat and the confronting radially inward portion of said second member of said seat carrier are shaped in relation to each other to diverge progressively away from each other in a radially inward direction to provide, when the parts of said valve are assembled, said clearance space between the radially inward portion of the radially outward side of said valve seat and said second member.

16. The valve seat and associated seat carrier according to claim 13, wherein said clearance space is provided by the confronting radially inward portion of said second member which is tapered so as to diverge inwardly away from the radially inward portion of said valve seat.

17. The valve seat and associated seat carrier according to claim 13, wherein said valve seat surface comprises a compound made up of a 45° plane on one end and a radius of curvature on the other end which varies from 40 to 70 percent of the radius of said ball.

18. The valve seat and associated seat carrier according to claim 13, wherein pressure equalization of the valve seat is provided by an annular U-shaped seal between said seat carrier and the wall of said valve chamber that can be energized in one direction only, said seal comprising a U-shaped jacket surrounding a U-shaped spring, the bases of said jacket and spring being separated by an expansion band.

* * * * *